Patented Jan. 9, 1968

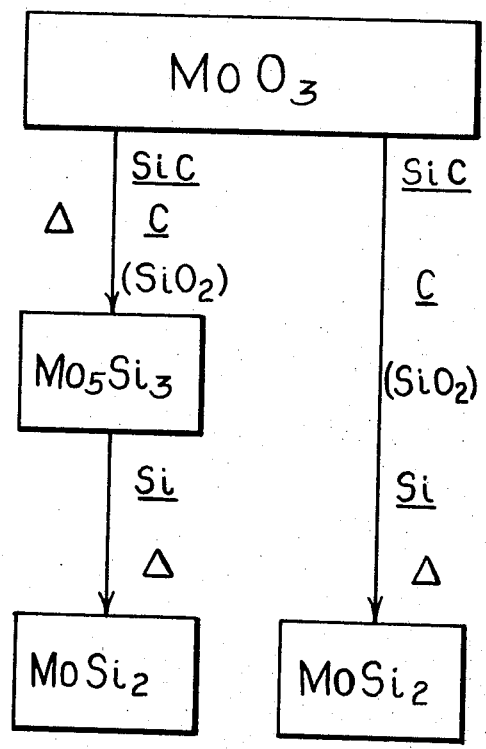

3,362,787
PREPARATION OF MOLYBDENUM SILICIDES
Ben Matchen, Niagara Falls, Ontario, Canada, assignor to Norton Company, Worcester, Mass., a corporation of Massachusetts
Filed Feb. 4, 1964, Ser. No. 342,357
5 Claims. (Cl. 23—204)

ABSTRACT OF THE DISCLOSURE $Mo_5Si_3$ and $MoSi_2$ are prepared by heating molybdic oxide with silicon in the presence of carbon and silicon carbide; silica is preferably also present; $MoSi_2$ may be prepared from $Mo_5Si_3$ by heating with silicon in the presence of carbon; furnace temperatures of 1700° to 1950° C. are employed with times of 3 to 8 hours, preferably in a continuous kiln. Hot pressing of product yields pieces having 94.4% theoretical density, good oxidation resistance. Mixtures of molybdenum silicide with alumina or magnesia were hot pressed to give strong products.

---

This invention relates to the preparation of molybdenum silicides from molybdenum oxide employing silicon carbide as a source for at least some of the silica. In particular, the objects of this invention are economically to produce compounds of molybdenum and silicon having Si to Mo ratios of from 1.6 to 2 or higher and from 0.55 to 5.65, corresponding to the theoretical compounds $MoSi_2$ and $Mo_5Si_3$, respectively.

The drawing shows a flow sheet illustrating the processes described and claimed for producing molybdenum silicides.

Very few of the less common silicides have reached commercial prominence. However, one of these which appears headed in this direction is molybdenum disilicide which has been found to be very stable in the ordinary atmosphere at high temperatures in the range of 2000° C. and to exhibit high heat conductivity, resistance to oxidation, and heat shock resistance. For example, the heat conductivity of molybdenum disilicide is about 0.075 cal./sec./cm.$^2$/° C. (20° to 200° C.), and it has a resistivity of approximately 20 microhms-cms. It has been found that molybdenum disilicide is useful in electrical resistance elements and has been used as an impregnant in a silicon carbide element to render such resistance bars serviceable at much higher temperatures than has been possible heretofore. Such a bar is disclosed in the co-pending application of John Fredriksson, Ser. No. 43,877 for Electrical Bars, filed July 19, 1960, now Patent No. 3,171,871.

The resistance to oxidation at temperatures up to 1650°–1750° C. makes molybdenum disilicide promising for electrical heating elements as noted above and as structural shapes in specific locations of combustion chambers, gas turbines, kilns, high temperature dies, induction-brazing fixtures, etc. The mechanism of the oxidation resistance is not precisely known, except that it is relatively poor below 1000°–1200° C., then becomes speculated as due to formation of a silica skin stable up to its melting point of about 1700° C. Another theory claims that protection is provided by a very adherent glassy layer 0.003 to 0.1 mm. thick consisting of a complex molybdenum-silicon oxide. It is recommended (within this theory) that molybdenum disilicide speciments be preheated above 1400° C. to insure formation of the protective glass layer and thus protect the material against oxidation at lower temperatures.

Molybdenum disilicide greatly improves the oxidation resistance of borides. Zirconium diboride has good oxidation resistance up to about 1300° C. and it has been reported that addition of 10% molybdenum disilicide to the boride dramatically increases the temperature of effective oxidation resistance to 1950° C. This property of titanium diboride, having good resistance up to about 1400° C., may be similarly improved.

Cermets have been produced with molybdenum disilicide as the base material, together with various refractory oxides, to improve thermal shock and oxidation resistance and to impart more refractoriness to bodies produced therefrom. Suggested applications include kiln furniture, saggers, sand-blast nozzles, exhaust tube linings, etc. Alumina is the most common oxide used because its thermal expansion coefficient ($8.8\times10^{-6}$/° C.) closely matches that of the disilicide ($8.4\times10^{-6}$/° C.). Other oxides or mixtures of oxides may be used. The silicide may also be used as a binder for carbide and, as mentioned above, boride bodies, and has been found to bind with metallic materials such as nickel, cobalt, iron and stainless steel. Addition of these metals increases thermal shock resistance.

Molybdenum disilicide is ideal for use in chemical processing equipment because of its resistance to most inorganic acids including aqua regia, aqueous alkali solutions, and liquid metals such as sodium, zinc, bismuth, and gallium.

It has recently been suggested to use the disilicide as one portion of a thermocouple with boron carbide or chromium silicide as the other portion. The potential application of the thermocouples is associated with production of molten ferrous and non-ferrous metals.

Metallic molybdenum has relatively poor oxidation resistance and the disilicide can be used to form a protective covering thereon. Such coatings having a thickness of less than 0.125 mm. and provide protection for over 1000 hours in air at 1700° C. Thermal shock resistance of the coating is excellent and a film of silicon dioxide on the silicide heals the cracks which may appear. It has been proposed that the molybdenum disilicide coating on metallic molybdenum consists of a thin intermediate molybdenum-rich layer and a dense silicide layer. Molybdenum disilicide, flame-sprayed on molybdenum provides oxidation protection for 60 seconds in a Mach 2 airstream at 3800° F. The disilicide may also be used as a protective coating for graphite linings in uncooled rocket motors.

The melting point of molybdenum disilicide has variously been reported as 1850° C. and as 2030±50° C. It is crystallized in a tetragonal system having lattice constants of $a=3,200$ A., $c=7.86$ A., $c/a=2.457$. The density from X-ray data is 6.24 grams per cubic centimeter and its tensile strength, like that of graphite, increases with increasing temperature.

The silicide of molybdenum having the formula $Mo_5Si_3$ has been considered one of the lesser important of the silicides. However, it has been found that this silicide of molybdenum may be combined as a major constituent with various oxides or mixtures of oxides from the second and third groups of the periodic table including alumina, calcium aluminate, magnesium aluminate and magnesia. These compositions exhibit desirable electrical resistivity and strength properties for use in high temperature (1500° to 1700° C.) heating elements. $Mo_5Si_3$ is also useful as a major constituent of elements in electrical appliances. Because of the high quantity of contained molybdenum (85.1% compared with 63.1% for molybdenum disilicide) this silicide finds application as an additive in metallurgical processes. It is also used as an oxidation-resistant protective coating for molybdenum and may be foamed to provide lightweight, easily-shaped, oxidation resistant refractory linings for certain types of furnaces and kilns. Additionally, it has been found that this silicide of molybdenum is suitable and may be effectively utilized as a raw material in one process for the production of molybdenum disilicide.

Mo$_5$Si$_3$ is crystallized in a hexagonal system having lattice constants of $a=7.271$ A., $c=4.992$ A. and $c/a=0.687$. It is not a true binary compound, but a ternary compound which is stabilized by around 1% by weight of or by carbon, nitrogen, oxygen or boron. The amounts of these materials can vary considerably without affecting the basic structure of the silicide, although such variations will cause corresponding variations in the size of the lattice parameters.

The silicides of molybdenum, and particularly the disilicide, have heretofore been prepared by melting elemental molybdenum with elemental silica. However, at the temperature required for the fusion of these elements, a reaction may occur between the material and the container such that the products are contaminated and the desirable properties thereof are impaired. Moreover, the elemental products of substantial purity which are required, are unduly high in price.

In attempting to overcome these difficulties, the prior art has suggested reacting molybdenum oxide with silicon in a furnace heated by an oxy-hydrogen blow pipe. It has also been proposed to use fluxes such as lime and magnesia or cryolite, the resulting product being leached with nitric acid and dilute hydrofluoric acid to obtain the crystals of molybdenum disilicide. However, none of these attempts has resulted in an economical process.

A still more recent proposal has been to heat an intimate mixture of comminuted elemental molybdenum and comminuted elemental silicon in a vacuum or in an inert atmosphere at a temperature below fusion to form the disilicide. However, the expense of the elemental reactants is still present and the ultimate expense of production is increased even more by the necessity of providing a vacuum or inert atmosphere.

It has been found that molybdenum silicide of good yield and high purity may be produced by heating a mixture of molybdenum oxide, silicon carbide and carbon at elevated temperatures and for periods of time such that the constituents will combine to form the silicide.

It has been found that molybdenum oxide may be used in the form of a commercially available mix which contains also silicon oxide and carbon. The molybdenum oxide is intimately mixed with silicon carbide and additional carbon and heated at elevated temperatures. The constituents combine in the solid phase to produce Mo$_5$Si$_3$.

Suitable conditions for the heating portion of the treatment include temperatures between about 1700° and 1950° C. and the heating step is continued for a length of time such that there is complete reaction between the particles in the mixture, generally from about three to about eight hours. It has been noted that a second firing of the reaction product at a somewhat higher temperature for from one to several minutes may increase the purity of the yield.

The reaction times and temperatures within those given above are regulated according to the "texture" of product desired. For example, a dense product requires a higher temperature and/or longer reaction time, whereas a sintered product requires a lower temperature and/or shorter reaction time. If the silicide is to be used as a raw material for the production of molybdenum disilicide, a sintered product is desired, as opposed to the fused, metallic appearing dense material, since it is easier to break down for subsequent reaction.

The particles of molybdenum oxide mix and the coke should generally be not substantially larger than will pass a 24-mesh screen; the silicon carbide should be of a size to pass a 54-mesh screen. Smaller particles may be used to allow even closer contact between the reactants.

The average particle size of the raw materials used in this process is set forth in the following table, the notations regarding the size being read as particles which will pass through (T) a certain screen size and be retained (on) on a screen of finer mesh (U.S. Sieve Series).

TABLE 1

|  | MoO$_3$ Mix (MoO$_3$-SiO$_2$-C) | SiC T54 | Coke T24 |
| --- | --- | --- | --- |
|  | Percent | Percent | Percent |
| T24 on 44 | 16.5 |  | 48.3 |
| T44 on 72 | 12.0 | 37.1 | 26.2 |
| T72 on 10X | 9.4 | 23.5 | 7.6 |
| T10X on 18X | 17.1 | 20.8 | 15.9 |
| T18X on 25S | 9.3 | 5.2 | 0.3 |
| T25S | 35.7 | 13.4 | 1.7 |
|  | 100.0 | 100.0 | 100.0 |

As noted above, molybdenum oxide mix contains small amounts of silicon oxide and carbon. It is commercially available and has an average product analysis of approximately 77.4% molybdenum oxide (MoO$_3$), 10% silicon oxide (SiO$_2$) and 12% coke. In the process of this invention the reaction mixture contains from about 65 to 75 parts of MoO$_3$, from about 15 to 25 parts silicon carbide and from about 7 to 20 parts carbon (in the form of coke), each by weight of the total reaction mixture. When employing the above specified MoO$_3$-SiO$_2$-coke mix (available in briquetted form), I have found that the following proportions within the above range are preferred:

Parts
MoO$_3$-SiO$_2$-C mix ———————————————— 86 to 92
SiC ———————————————————————— 5 to 10
Coke ——————————————————————— 1 to 5

Relatively less amounts of silicon carbide and carbon are necessary since the silicon oxide and carbon contained in the MoO$_3$-SiC-C provide some of the reactants necessary for combination with molybdenum to form the silicide with some carbon remaining available for additional reaction. It is not certain whether the silicon oxide and carbon go through a silicon carbide stage before being converted to the silicide; that is, the silicon oxide (SiO$_2$) may form the silicide with the molybdenum before going through a silicon carbide or silicon oxide (SiO) stage.

In the following example and throughout the specification and claims, all parts are parts by weight unless otherwise specified.

EXAMPLE 1

Molybdenum oxide ore, silicon carbide and coke having a particle size in the range of that shown in Table 1 were thoroughly mixed together in the following proportions:

Parts
Molybdenum oxide ore ———————————————— 267
Silicon carbide ———————————————————— 22
Petroleum coke ——————————————————— 8

The mixture was placed in a graphite mold, covered with a graphite slab and heated in an induction furnace at 1800° C. for four hours and then heated to a temperature of 1925° C. and held for about one minute. The resulting product was largely Mo$_5$Si$_3$ and the chemical analysis was as follows:

Percent
Mo ———————————————————————— 81.72
Si ————————————————————————— 13.34
C ————————————————————————— 2.83
                                                          97.89

X-ray analysis showed that substantially all of the material was Mo$_5$Si$_3$, the identifying lines being 2.145 A., 2.064 A. and 1.373 A. There was a trace of either MoSi$_2$ or Mo$_2$C. Two lines of spacing, $d=1496$ A. and $d=1.115$ A., both weak, could not be correlated with any crystalline compound.

While the above example illustrates the use of molybdenum oxide ore in the process of this invention, molybdenum oxide of higher purity may be utilized with correspondingly larger amounts of silicon carbide and carbon being included in the reaction mixture. This, however, is less economical, and the ore is preferred.

The reaction may be carried out in a batch process in, for example, an induction furnace as shown in Example 1. Alternatively, a continuous process may be used wherein the reaction mixture is passed through a continuous kiln having a hot zone temperature between 1800° and 1900° C. In a hot zone measuring about 50 inches in length, the rate of passage may vary from about 6 to about 10 inches per hour.

Portions of molybdenum silicide produced according to this invention were tested for oxidation resistance. Half-inch diameter pieces were hot pressed at 1800° C. and 4000 p.s.i. The average density was 7.45 grams per cubic centimeter (91.0% of theoretical density) and the average resistivity was 154 microhm-centimeters. The samples were placed in a moving-air furnace and heated for 8 hours at temperatures varying from 650° to 1450° C. Except for very thin surface changes, the inner portions of the specimens remained unchanged, retaining a dense, grey-metallic appearance with no signs of cracks or other damage.

Other portions of the silicide were combined with alumina (from 0 to 75% $Al_2O_3$) and with magnesia (from 0 to 60% MgO). The densities of hot-pressed pieces ranged from 83 to 90% of theoretical and the electrical resistivity and strength characteristics were excellent.

It has been found that molybdenum disilicide of good yield and high purity may be produced by heating a mixture of $Mo_5Si_3$ and silicon at elevated temperatures and in a reducing atmosphere such as carbon monoxide for periods of time such that the constituents will combine to form the disilicide. Additional reactants may include silicon oxide as silica sand, silicon carbide and molybdenum oxide. Alternatively, it has been found that the disilicide may be prepared directly from the raw materials used to produce $Mo_5Si_3$ together with silicon and, if desired, silica sand.

More particularly, and with reference to the preferred mode of this invention, it has been found that molybdenum silicide of the formula $Mo_5Si_3$ such as produced by the method disclosed above, or the raw materials used in the production thereof, may be mixed with appropriate amounts of silicon and preferably also silica sand and heated in a reducing atmosphere in a conventional furnace to form the disilicide. Additional ingredients may be included as indicated above. The reaction may be conducted as a batch process in a suitable furnace or as a continuous process by conveying the mixture through the heating zone of a continuous kiln.

The preparation of molybdenum disilicide directly from molybdic oxide has several advantages over production from the silicide. It is apparent that for both practical and economic reasons, a one-stage process is preferable to one necessitating two stages. Furthermore, the raw materials are more uniform in composition. Also, the necessary reducing atmosphere is supplied by the reaction.

Suitable conditions for the heating step to produce the reaction of my invention include temperatures between about 1700° and 1950° C. The heating step is continued in the atmosphere produced by the reactants, i.e., carbon monoxide, for a length of time such that there is a complete reaction between the particles in the mixture, e.g., for from about three to about eight hours. When the process is conducted in a continuous kiln, the rate of travel through the hot zone, for example, one about four feet in length and having a temperature between 1700° and 1950° C., may vary between six and ten inches per hour. For economic reasons, a fast rate and high temperature is preferred to maintain a high rate of production.

While a continuous kiln appears to be the most desirable type of furnace for quantity production of molybdenum disilicide in accordance with the reaction described above, it is emphasized that other types of furnaces such as any intermittent type of resistance furnace or induction heating furnace may be effectively used.

The particle size of the raw materials is not critical, and a wide range is operable in my process. However, it has been found that the reaction proceeds more satisfactorily when the materials will pass a certain screen size. In this way, no oversize particles are used which might subsequently not react completely and there is no waste of fines. Commercial elemental silicon, molybdenum oxide and silica sand are usually of a size to be used as received.

Because of the above considerations, no optimum particle size of the various raw materials has been determined. It may be generally stated that finer materials probably react better than coarser materials but there is a point beyond which additional reduction in particle size is ineffective in giving a better product and is uneconomical. For example, screen analyses of materials for preparation of the disilicide from $Mo_5Si_3$ are listed below, the notations regarding size being read as particles which will pass through (T) a certain screen size and be retained (on) on a screen of finer mesh.

TABLE 2

| Screen Size | $Mo_5Si_3$ (T24) | Silicon (T44) | Sand (as rec'd.) | SiC (T54) |
|---|---|---|---|---|
| | Percent | Percent | Percent | Percent |
| On 24 | | | 1.1 | |
| T24 on 44 | 37.8 | | 76.0 | |
| T44 on 72 | 28.8 | 9.9 | 21.6 | 37.1 |
| T72 on 10X | 12.1 | 20.7 | 0.9 | 23.5 |
| T10X on 18X | 10.6 | 32.2 | 0.2 | 20.8 |
| T18X on 25S | 3.1 | 9.7 | 0.1 | 5.2 |
| T25S | 7.6 | 27.5 | 0.1 | 13.4 |
| | 100.0 | 100.0 | 100.0 | 100.0 |

Proportions of the raw materials may vary between 65 and 75% molybdenum silicide, between 20 and 35% elemental silicon, between 0 and 15% of silica sand, between 0 and 10% silicon carbide and between 0 and 5% pure molybdenum oxide, each by weight of the total mixture.

In the following examples and throughout the specification and claims all parts are parts by weight unless otherwise specified.

EXAMPLE 2

Molybdenum silicide having the formula $Mo_5Si_3$ and having the following chemical analysis:

| | Percent |
|---|---|
| Mo | 81.41 |
| Si | 13.17 |
| C | 2.23 |
| | 96.81 | was intimately mixed with other raw materials having the proportions listed below:

| Material: | Proportion by weight, percent |
|---|---|
| $Mo_5Si_3$ | 70 |
| Silicon | 22.5 |
| Molybdenum oxide | 3.5 |
| Silica sand | 4 |
| | 100.0 |

The mixture was placed in a molding furnace and heated for three hours at 1950° C. in the presence of carbon to provide a non-oxidizing atmosphere. The product had a chemical analysis as follows:

| | Percent |
|---|---|
| Mo | 64.21 |
| Si | 30.51 |
| C | 1.22 |
| Total analyzed | 95.94 |
| Mo+Si _____percent__ | 94.72 |

Atomic ratio, $MoSi_{1.63}$.

The product was somewhat deficient in silicon so the ingredients in the following examples were proportioned to improve the molybdenum to silicon ratio.

EXAMPLE 3

Another portion of molybdenum silicide having the same formula and chemical analysis as that of Example 2 was intimately mixed with other raw materials having the proportions listed below:

| Material: | Proportion by weight, percent |
|---|---|
| $Mo_5Si_3$ | 70 |
| Silicon | 20 |
| Silica sand | 10 |
|  | 100 |

The mixture was placed in a graphite boat, covered with a graphite slab, and passed through a continuous kiln having the following reaction conditions:

Preheat zone power input—15 kw., 74″ long
Hot zone power input—105 kw., 48″ long
Temperature reading, hot zone—1850° C.
Rate of travel—7″/hr.

The product (89.5% of theoretical yield based on Mo) was dense, semi-fused, silver-gray and quite metallic in appearance. Its chemical analysis was as follows:

| | Percent |
|---|---|
| Mo | 62.79 |
| Si | 33.46 |
| C | 0.41 |
| Fe | 0.76 |
| N | 0.04 |
| Total analyzed | 97.46 |
| Mo+Si percent | 96.25 |

Atomic ratio, $MoSi_{1.93}$.

An X-ray analysis of the above product failed to indicate the presence of any crystalline material other than $MoSi_2$. The X-ray pattern showed the three strongest characteristic lines of pure $MoSi_2$ at 3.96, 2.99 and 2.034 A., and was in every way identical to the pattern of $MoSi_2$. No lines characteristic of any other crystalline material could be observed indicating the total absence of any other crystalline material.

In Example 3 above, the preheat zone is indicated as having a length of 74 inches. This includes the entire length before the product reaches the hot zone temperature of between 1700° C. and 1850° C. This preheat zone may also be considered as including both a true preheat zone of 54 inches and an intermediate zone of 20 inches.

In the following examples the disilicide was prepared directly from molybdic oxide. In each example the reaction of the mixture indicated was carried out in a molding furnace. The $MoO_3$ mix consists of 77.4% $MoO_3$, 10% $SiO_2$ and 12% carbon in the form of coke.

MIXTURE (PERCENT BY WEIGHT)

| Ex. | $MoO_2$ Mix | SiC | Si | Coke | Silica Sand | Silica (° C.) | Temp. (Hrs.) |
|---|---|---|---|---|---|---|---|
| 4 | 76.25 | 6.5 | 1 | 13.75 | 2.5 | 1,800 | 4 |
| 5 | 75 | 6.25 | | 17.5 | 1.25 | 1,750 | 5½ |
| 6 | 72.5 | 6.25 | | 17.5 | 3.75 | 1,750 | 5½ |
| 7 | 72.5 | .25 | | 17.5 | 3.75 Refired | 1,700 1,725 | 4 1 |

The yield, based on the weight of the respective starting mix, and chemical analysis of the products obtained in Examples 4–7 was as follows:

CHEMICAL ANALYSIS (PERCENT)

| Example | Yield | Mo | Si | C | Fe | Total | Mo+Si | Atomic Ratio |
|---|---|---|---|---|---|---|---|---|
| 4 | 42.8 | 67.16 | 30.26 | 0.58 | 0.81 | 98.81 | 97.42 | $MoSi_{1.55}$ |
| 5 | 46.3 | 64.91 | 31.00 | 2.05 | 0.74 | 98.70 | 95.91 | $MoSi_{1.64}$ |
| 6 | 30.9 | 64.91 | 31.83 | 1.96 | 0.77 | 99.47 | 96.74 | $MoSi_{1.68}$ |
| 7 | 58.1 | 64.83 | 29.91 | 0.50 | 0.69 | 95.93 | 94.74 | $MoSi_{1.58}$ |

While no examination was conducted on the product of Example 4, the results of an X-ray examination of the remaining products is as follows:

| Example | Strongest X-ray Lines (A.) | | | |
|---|---|---|---|---|
| 5 | 3.91 | 2.95 | 2.259 | 2.022 |
| 6 | 3.91 | 2.95 | 2.259 | 2.020 |
| 7 | 3.90 | 2.96 | 2.264 | 2.020 |

While Examples 4–7 illustrate the production of molybdenum disilicide from the molybdic ore in a batch furnace, a continuous kiln may also be used. A recommended mixture for production in the kiln is as follows:

| Material: | Proportion by weight, percent |
|---|---|
| Molybdenum oxide mix ($MoO_3$—SiC—C) | 70 |
| Silicon carbide | 6 |
| Silicon | 20 |
| Silica sand | 4 |

Recommended reaction conditions include a hot zone temperature of about 1750° C. and a rate of travel of about 6½ inches per hour in the furnace mentioned above.

Portions of the molybdenum disilicide produced according to this invention were tested for hot pressing characteristics, modulus of rupture at room and elevated temperatures, and oxidation resistance at temperatures from 1000° to 1450° C. The product of Example 3 was formed into pieces approximately ½-inch in diameter and 2½ inches in length at a temperature of 1675° C. and a pressure of 3000 p.s.i. The average weight loss of three test pieces was 1.1%, while the average density was 94.4% of theoretical and the average resistivity 32.9 microhm centimeters. The modulus of rupture of two of these specimens was 18,100 p.s.i. and 17,390 p.s.i. respectively at room temperature, and both had a value of 14,350 p.s.i. at 1200° C.

Additional specimens were placed in a moving-air furnace for eight hours at 1000°, 1200° and 1450° C. with the following results:

TABLE 3

| Temperature | Weight Loss, Percent | Remarks |
|---|---|---|
| 1,000° C | 0.83 | No change; surface slightly duller. |
| 1,200° C | 0.70 | Glaze starting to form. |
| 1,200° C.[1] | 0.73 | Do. |
| 1,450° C | 0.65 | Brown glaze over whole piece. |
| 1,450° C.[1] | 0.57 | Do. |

[1] These specimens had previously undergone cross-bending tests at 1,200° C.

What is claimed is:

1. A method of making $Mo_5Si_3$ comprising heating a mixture consisting of molybdenum oxide, 65 to 75 parts, silicon carbide 15 to 25 parts, and carbon 7 to 20 parts, at a temperature of from 1700° C. to 1950° C. for at least three hours.

2. A method of making $MoSi_2$ comprising heating a mixture consisting of molybdenum oxide, 65 to 75 parts, silicon carbide 15 to 25 parts, carbon 7 to 20 parts, and silicon 15 to 20 parts at a temperature of from 1700° C. to 1950° C. for at least three hours.

3. A process according to claim 2 wherein the reaction mix includes $SiO_2$.

4. A process for producing $MoSi_2$ comprising heating a source of $Mo_5Si_3$ in the presence of elemental silicon in the amount of at least 7 moles of silicon for each 5 moles of $MoSi_2$ produced, said heating taking place under non-oxidizing conditions at a temperature of at least 1700° C.

5. A process according to claim 4 in which the source of $Mo_5Si_3$ is a mixture of molybdenum trioxide, silicon carbide, and carbon.

References Cited

UNITED STATES PATENTS 2,619,406  11/1952  Briney _____ 23—204

FOREIGN PATENTS 837,979  6/1960  Great Britain.

MILTON WEISSMAN, *Primary Examiner.*

OSCAR R. VERTIZ, *Examiner.*

H. S. MILLER, *Assistant Examiner.*